(12) United States Patent
Tani

(10) Patent No.: US 12,142,052 B2
(45) Date of Patent: Nov. 12, 2024

(54) INFORMATION PROCESSING SYSTEM, INFORMATION PROCESSING METHOD, AND NON-TRANSITORYCOMPUTER-READABLE MEDIUM

(71) Applicant: NEC Corporation, Tokyo (JP)

(72) Inventor: Hideaki Tani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 134 days.

(21) Appl. No.: 17/801,564

(22) PCT Filed: Feb. 19, 2021

(86) PCT No.: PCT/JP2021/006507
§ 371 (c)(1),
(2) Date: Aug. 23, 2022

(87) PCT Pub. No.: WO2021/187012
PCT Pub. Date: Sep. 23, 2021

(65) Prior Publication Data
US 2023/0126219 A1    Apr. 27, 2023

(30) Foreign Application Priority Data
Mar. 16, 2020   (JP) ................ 2020-045223

(51) Int. Cl.
*G06V 20/52*    (2022.01)
*G06V 40/10*    (2022.01)
(52) U.S. Cl.
CPC ............ *G06V 20/52* (2022.01); *G06V 40/103* (2022.01); *G06V 2201/07* (2022.01)

(58) Field of Classification Search
CPC ... G06V 20/52; G06V 40/103; G06V 2201/07
See application file for complete search history.

(56) References Cited

U.S. PATENT DOCUMENTS

| 11,565,709 B1 * | 1/2023 | Caldwell ................ G06N 3/088 |
| 2012/0290950 A1 * | 11/2012 | Rapaport ............ H04L 12/1818 |
| | | 715/753 |

(Continued)

FOREIGN PATENT DOCUMENTS

| JP | 2007-274156 A | 10/2007 |
| JP | 2009-120327 A | 6/2009 |

(Continued)

OTHER PUBLICATIONS

International Search Report for PCT Application No. PCT/JP2021/006507, mailed on May 25, 2021.

(Continued)

*Primary Examiner* — Mishawn N. Hunter
(74) *Attorney, Agent, or Firm* — Sughrue Mion, PLLC

(57) ABSTRACT

An object of the present disclosure is to manage an improvement state of usage manners of a user.
An information processing system (10) according to the present disclosure includes: a user information acquiring means (1) for acquiring user information related to usage manners of a user; a manner score managing means (2) for calculating and accumulating a manner score according to the user information; a manner score comparing means (3) for comparing, for each user, a past manner score with a current manner score and for generating a comparison result; and an information presenting means (4) for presenting, to a user, information according to the comparison result.

7 Claims, 3 Drawing Sheets

(56) References Cited

U.S. PATENT DOCUMENTS

| | | |
|---|---|---|
| 2013/0332410 A1 | 12/2013 | Asano et al. |
| 2020/0005059 A1 | 1/2020 | Yamada et al. |
| 2021/0312341 A1* | 10/2021 | Kubota ................. G06Q 10/02 |

FOREIGN PATENT DOCUMENTS

| | | |
|---|---|---|
| JP | 2012-150557 A | 8/2012 |
| JP | 2012-216203 A | 11/2012 |
| JP | 2013-254372 A | 12/2013 |
| JP | 2015-108854 A | 6/2015 |
| JP | 2016-103079 A | 6/2016 |
| JP | 2019-168815 A | 10/2019 |

OTHER PUBLICATIONS

Esector, Ltd., "Social credit system and credit score", Nov. 26, 2019, [retrieved on May 13, 2021], pp. 1, Internet <https://web.archive.org/web/20191221084743/https://www.esector.co.jp/sec/S19-036.html>.

* cited by examiner

INFORMATION PROCESSING SYSTEM, INFORMATION PROCESSING METHOD, AND NON-TRANSITORYCOMPUTER-READABLE MEDIUM

This application is a National Stage Entry of PCT/JP2021/006507 filed on Feb. 19, 2021, which claims priority from Japanese Patent Application 2020-045223 filed on Mar. 16, 2020, the contents of all of which are incorporated herein by reference, in their entirety.

TECHNICAL FIELD

The present disclosure relates to a technique for managing manners of a user using a public transportation, an escalator, and the like.

BACKGROUND ART

In order to improve usage manners in using a public transportation, an escalator, and the like, there is a method of encouraging, by posting a poster, and the like, a user to pay attention, but in reality, merely preaching a mentality has not been effective. In addition, for example, a method of physically suppressing a manner violation (leaning over and running up/down) on an escalator is less likely to be adopted not only because of a high cost, but also because of risks of reduced boarding efficiency and an unexpected accident.

Patent Literature 1 discloses a technique of performing escalator control, based on an image processing result, in order to secure safety of a passenger using an escalator. In Patent Literature 1, an image acquired by a camera is processed and an unsteady motion of a passenger of the escalator is detected, the passenger is alerted according to an instance of abnormal boarding by a passenger, and adaptive control of the escalator is performed.

Patent Literature 2 discloses a technique of detecting behavior of a user being related to manners when the user uses a service and a circumstance around the user, and controlling quality of service that the user can receive, according to a manner point calculated according to the behavior of the user and the circumstance around the user.

CITATION LIST

Patent Literature

[Patent Literature 1] Japanese Unexamined Patent Application Publication No. 2009-120327
[Patent Literature 2] Japanese Unexamined Patent Application Publication No. 2012-150557

SUMMARY OF INVENTION

Technical Problem

As described above, while improvement of usage manners in using an escalator and the like is required, merely enforcing a rule is not effective in improving the usage manners. In Patent Literatures 1 and 2, although a user is alerted according to his/her usage status, it is not possible to manage an improvement status of usage manners of the user.

In view of the above-described problem, an object of the present disclosure is to provide an information processing system, an information processing method, and a program that are capable of managing an improvement state of usage manners of a user.

An information processing system according to the present disclosure includes: a user information acquiring means for acquiring user information related to usage manners of a user; a manner score managing means for calculating and accumulating a manner score according to the user information; a manner score comparing means for comparing, for each user, a past manner score with a current manner score and for generating a comparison result; and an information presenting means for presenting, to a user, information according to the comparison result.

An information processing method according to the present disclosure includes: acquiring user information related to usage manners of a user; calculating and accumulating a manner score according to the user information; comparing, for each user, a past manner score with a current manner score; and presenting information according to a comparison result to a user.

A program according to the present disclosure causes a computer to execute processing of: acquiring user information related to usage manners of a user; calculating and accumulating a manner score according to the user information; comparing, for each user, a past manner score with a current manner score; and presenting information according to a comparison result to a user.

According to the present disclosure, it is possible to provide an information processing system, an information processing method, and a program that are capable of managing an improvement status of usage manners of a user.

EXAMPLE EMBODIMENT

An example embodiment of the present disclosure is described below with reference to the drawings. For clarity of description, the following description and drawings are appropriately omitted and simplified.

Figure 1:
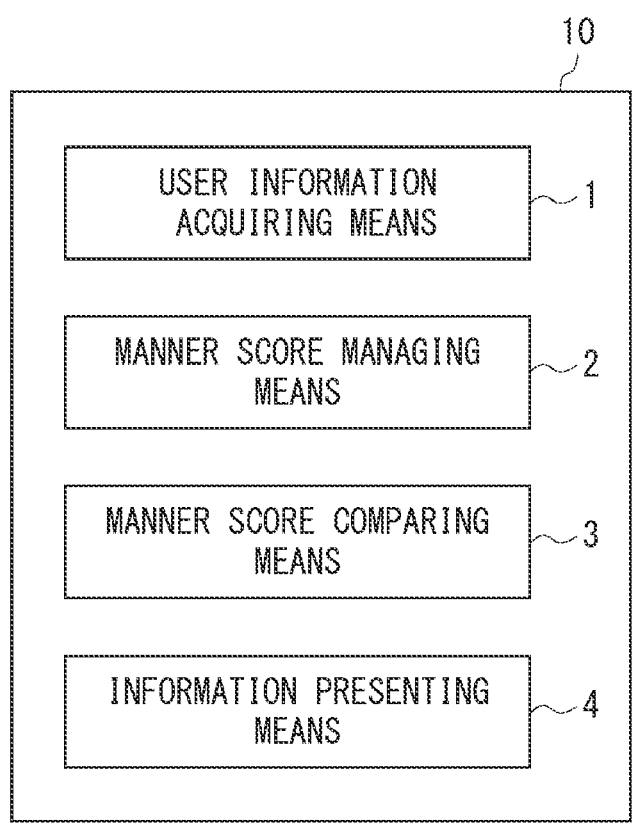
FIG. 1 is a block diagram illustrating one example of a configuration of an information processing system according to an example embodiment.

The example embodiment relates to a technique for managing manners of a user using a public transportation, an escalator, and the like. FIG. 1 is a functional block diagram illustrating one example of a configuration of an information processing system 10 according to the example embodiment. As illustrated in FIG. 1, the information processing system 10 includes a user information acquiring unit 1, a manner score managing unit 2, a manner score comparing unit 3, and an information presenting unit 4.

The user information acquiring unit 1 acquires user information related to usage manners of a user, and transmits the acquired user information to the manner score managing unit 2. The manner score managing means 2 calculates and accumulates a manner score according to the user information input from the user information acquiring means 1. The manner score comparing means 3 compares, for each user, a past manner score and a current manner score, and generates a comparison result. The generated comparison result is input to the information presenting means 4.

The information presenting means 4 presents information according to the comparison result input from the manner score comparing means 3 to the user. As described above, by comparing, for each user, the past manner score and the current manner score for each user, it is possible to grasp an improvement status of usage manners in using an escalator and the like and to make the user aware of improvement in manners, and as a result, it is possible to achieve improvement in manners.

Figure 2:
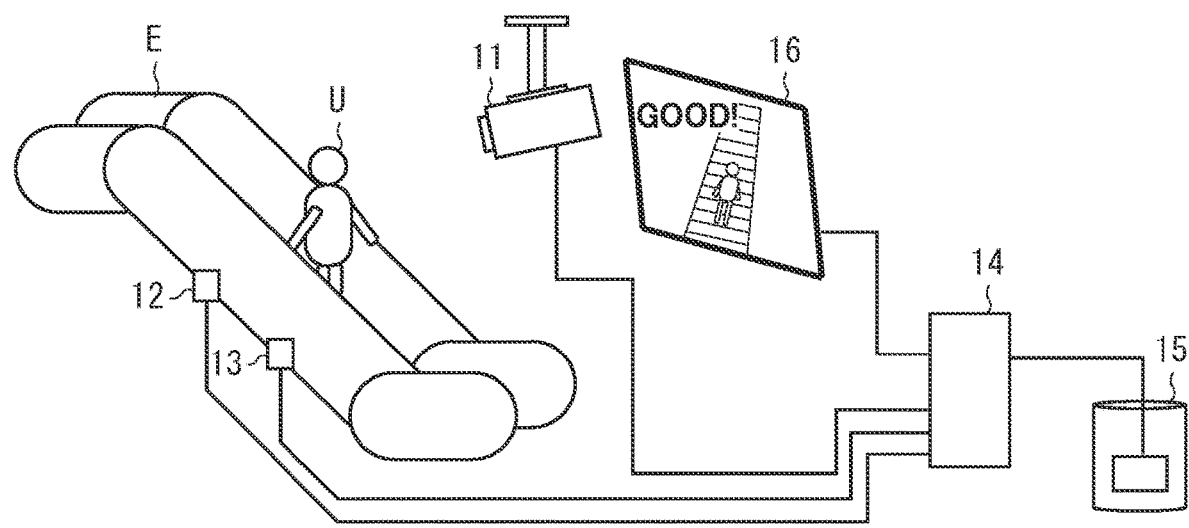
FIG. 2 is a diagram illustrating one example of a configuration of an information processing system according to an example.

Next, a specific example of the information processing system 10 is described with reference to FIG. 2. FIG. 2 is a diagram illustrating one example of the configuration of the information processing system 10 according to the example. Herein, it is assumed that the information processing system 10 manages an improvement status of usage manners of a user U who uses an escalator E.

The information processing system 10 includes a camera 11, a sound sensor 12, a vibration sensor 13, a server 14, an accumulation device 15, and a display 16. Herein, the camera 11, the sound sensor 12, and the vibration sensor 13 function as the user information acquiring unit 1 that acquires user information related to usage manners of a user. The user information acquiring means 1 may include at least one of the camera 11, the sound sensor 12, and the vibration sensor 13, and may include another sensor such as a temperature sensor, a pressure sensor, or the like.

The camera 11, the sound sensor 12, and the vibration sensor 13 acquire user information of each of one or a plurality of users U. More specifically, the camera 11 captures an image of the user U moving using the escalator E and acquires the image. The image captured by the camera 11 is transmitted to the server 14. The sound sensor 12 collects ambient sound including sound emitted by the user U. The vibration sensor 13 detects vibration in a step tread, a handrail, or the like of the escalator E caused by a motion of the user U. These pieces of sensor data are also transmitted to the server 14. Installation locations of the camera 11, the sound sensor 12, and the vibration sensor 13 are not particularly limited as long as they can acquire the user information of the user U.

The server 14 functions as a recognizing means for recognizing the user from the user information. For example, the server 14 can extract a feature of the user U (for example, shapes, positions, and the like of eyes, a nose, and the like.) from the image captured by the camera, and recognize the user by comparing the feature with a previously stored feature of the user. Note that, processing of recognizing the user from the captured image can also be executed by an image processing device built into the camera 11.

The server 14 recognizes a position of the user U from a received video, compares the position with an occurrence time and position of noise and vibration, and recognizes behavior of each user U. In addition, the server 14 refers to a manner evaluation rule stored in the storage device 15, and calculates, for each user U, a manner score according to the user information. The calculated manner score is associated with the recognized user U and stored in the storage device 15.

In the manner evaluation rule, for example, a positive score can be given to a state in which the user U stands upright on a step tread of the escalator running at a constant speed and a motion of the step tread and a motion of the user U are steady. On the other hand, for example, a negative score can be given to an act that violates manners, including a prohibited act such as leaning over a handrail, carrying an item outside an escalator boarding regulation, such as a stroller or a suitcase, onto the escalator, and an dangerous act on step treads, such as running backwards and running up or running down in a forward direction.

Then, the server 14 compares, for each user, a past manner score accumulated in the accumulation device 15 with a current manner score, and generates a comparison result. Specifically, in the example embodiment, the server 14 has the functions of the recognizing means, the manner score managing means 2, and the manner score comparing means 3.

The display (digital signage) 16 is installed in a position visible to the user U who is using the escalator E. The display 16 normally displays a video of the escalator E captured by the camera 11, which is looped back by the server 14.

The server 14 displays, on the display 16, a value of the manner score from a start to an end of use of the escalator E or a temporary prominent value, in a vicinity of the video of the user U on the display 16, at a timing immediately before or immediately after the user U steps off of the escalator E, when the manner score of the user U is an extreme value (for example, when a prohibited act such as leaning over or a dangerous act such as running backward is detected), or at another predetermined timing.

Further, the comparison result generated by the server 14 is input to the display 16. The display 16 can display warning information, award information (such as an evaluation word "GOOD!"), advice information for improving usage manners, and the like according to the comparison result with an overlay processing using CG, and can inform the user U himself/herself and surrounding users of the warning information, the award information, the advice information, and the like. As a result, the user U can recognize how much current boarding manners have improved from past boarding manners.

Figure 3:
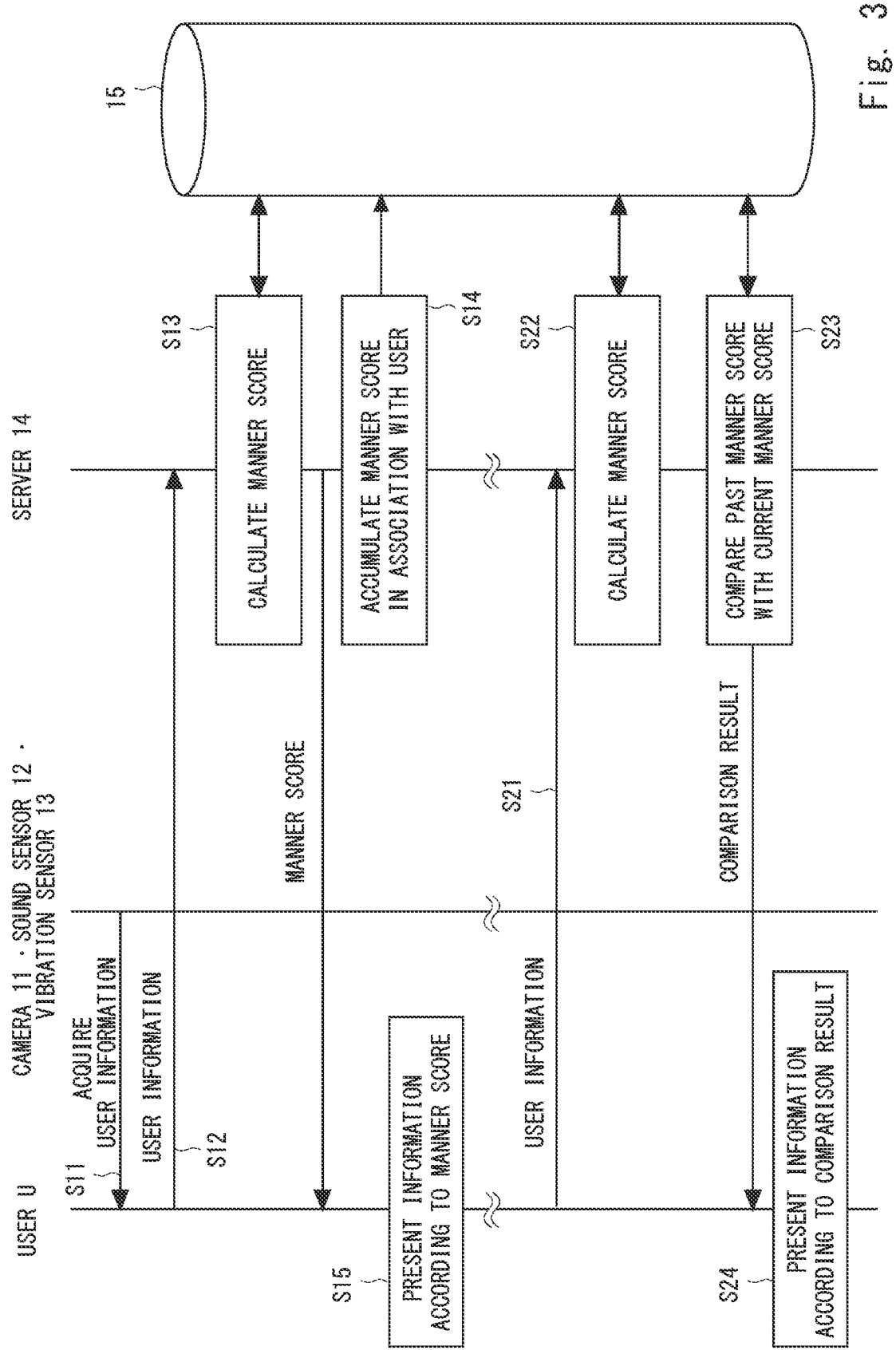
FIG. 3 is a sequence diagram illustrating an overall flow of processing by the information processing system according to the example embodiment.

An overall flow of the processing by the information processing system 10 is now described with reference to FIG. 3. FIG. 3 is a sequence diagram illustrating the overall flow of the processing by the information processing system 10. First, the camera 11, the sound sensor 12, and the vibration sensor 13 monitor the user U boarding on the escalator E and acquire user information (S11). The acquired user information is transmitted to the server 14 (S12).

The server 14 analyzes the user information, refers to a manner evaluation rule stored in the storage device 15, and calculates a manner score (S13). Further, the server 14 recognizes the user U from the user information, and stores the calculated manner score and the recognized user U in the storage device 15 in association with each other (S14). Then, a value of the calculated manner score, warning information according to the manner score, award information, and the like are displayed on the display 16 and are presented to the user U (S15).

For example, the server 14 identifies a current position of the user U from a video input from the camera 11. Further, the server 14 identifies a relation between the user U and sound acquired by the sound sensor 12 and/or vibration information acquired by the vibration sensor 13, based on a correspondence between the position of the user U and positions where the sound sensor 12 and the vibration sensor 13 are installed.

Then, the server 14 calculates a manner score by using the manner evaluation rule stored in the storage device 15. For example, the server 14 determines whether a standing position on a step tread is safe, whether a hand or a head is not out of the escalator, whether the user U is not looking forward, is not running up or down at a dangerous speed, is not moving backwards, and is not causing noise or vibration exceeding an allowable range.

When the calculated manner score is extremely bad, that is, when the user U deviates greatly from boarding manners, the server 14 overlays the warning information in the vicinity of a display position of the user U on the display 16. Further, at a timing immediately before or immediately after the user U steps off of the escalator E, the server 14 can also calculate a manner score of the user U from the start of use to the end of use, as an overall score, in accordance with a predetermined rule, and can overlay the overall score in a vicinity of a display position of a passenger on the display. The overall score may be, for example, a score value aggregated in a form of a maximum value, a minimum value, an average value, or the like.

For the user U with a high score exceeding a predetermined threshold value, an award message and decoration using CG can be sent to the to the display 16 and thereby well-mannered use can be praised. In addition, a speaker may be further added to the information processing system 10 and may generate an award melody for well-mannered use. It is also possible to give rewards (discount, coupon distribution, and the like), according to the manner score and thereby motivate the user U to improve his/her usage manners.

Note that, when there are a plurality of users U on the escalator E, scoring of manners and display of the warning information, the award information, and the like can be performed simultaneously and in parallel. As a result, behavior of the user U with good manners is highly evaluated, and on the contrary, the user U with bad manners is encouraged to improve. Further, an image of a potential risk and a better manner of boarding can be generated using CG and can be overlaid on the display 16, and thereby an advice for improving the usage manners can be provided to the user U with the bad manners.

Next, a case in which a past manner score of the user U exists in the storage device 15 is described. When the user information is transmitted to the server 14 (S21), the server 14 analyzes the current user information and calculates a manner score (S22). The server 14 recognizes the user U from the user information, and associates the calculated manner score with the recognized user U. When the user U recognized from the current user information matches a user associated with the past manner score, the server 14 compares the past manner score with the current manner score (S23).

Warning information, award information, and the like according to a result of the comparison are displayed on the display 16 and presented to the user U (S24). As described above, by comparing the past manner score and the current manner score, it is possible to point out a point improved and a point worsened from boarding manners in the past and to make the user U aware of improvement in manners, and as a result, it is possible to achieve improvement in manners.

Note that a specific hardware configuration of the information processing system 10 according to the example embodiment includes various variations and is not limited to a specific configuration. For example, a device according to the present disclosure may be achieved by using software, or may be configured in such a way as to share various types of processing by using a plurality of pieces of hardware. Each component may be configured of a single circuit (a processor and the like) or a combination of a plurality of circuits. The circuit referred to herein may be either dedicated or general-purpose.

A program according to the present example embodiment may be any program as long as it causes a computer to execute the processing illustrated in FIG. 3. In the above example, the program is stored by using various types of non-transitory computer readable medium, and can be provided to the computer. The non-transitory computer readable media include various types of tangible storage medium. An example of the non-transitory computer readable medium includes a magnetic recording medium (for example, a flexible disk, a magnetic tape, and a hard disk drive), a magneto-optical recording medium (for example, a magneto-optical disk), a CD read only memory (CD-ROM), a CD-R, a CD-R/W, and a semiconductor memory (for example, a mask ROM, a programmable ROM (PROM), an erasable PROM (EPROM), a flash ROM, and a random access memory (RAM)). The program may also be supplied to the computer by using various types of transitory computer readable medium. An example of the transitory computer-readable medium includes an electrical signal, an optical signal, and an electromagnetic wave. The transitory computer readable medium can provide the program to the computer via a wired communication path such as an electrical wire and an optical fiber, or via a wireless communication path.

As described above, in the example embodiment, it is possible to make the user U aware of improvement in manners by monitoring an escalator boarding status of each user U by using a camera and a sensor, scoring the boarding status, and informing the user U himself/herself (and the surrounding users) of the score, instead of forcing the user U to observe good manners. In addition, by incorporating a game-like element such as obtaining a reward according to the manner score, it is possible to improve the manner of use while enjoying.

Note that, the present invention is not limited to the above-described example embodiment, and can be appropriately modified within a range not deviating from a gist. Although the above-described example embodiment is targets improvement in usage manners of an escalator, in principle, the present invention is applicable to anything that is used by a large number of users and thus requires observance of good manners. For example, the present invention can be applied to a case in which improvement in usage manners of a public transportation or a cafeteria is encouraged.

In order to encourage improvement in driving manners of a vehicle on a road, it is possible to monitor an operating status of the vehicle (for example, noise such as car horn and engine noise, waiting for a traffic light an intersection, cutting in, use of a high beam, and the like) and perform scoring. In this case, recognition of a driver of the vehicle may be performed by recognizing a face of the driver from a captured image or, for example, numbers on a license plate of the vehicle may be read and the vehicle may be identified, and thereby the driver may be estimated.

Although the invention of the present application has been described above with reference to the example embodiment, the invention of the present application is not limited to the above description. Various modifications that can be understood by a person skilled in the art can be made to the configuration and details of the present invention, within the scope of the invention.

This application is based upon and claims the benefit of priority from Japanese Patent Application No. 2020-045223, filed on Mar. 16, 2020, the entire disclosure of which is incorporated herein by reference.

REFERENCE SIGNS LIST

1 USER INFORMATION ACQUIRING MEANS
2 MANNER SCORE MANAGING MEANS
3 MANNER SCORE COMPARING MEANS
4 INFORMATION PRESENTING MEANS
10 INFORMATION PROCESSING SYSTEM
11 CAMERA
12 SOUND SENSOR
13 VIBRATION SENSOR
14 SERVER
15 ACCUMULATION DEVICE
16 DISPLAY
U USER
E ESCALATOR

What is claimed is:

1. An information processing system comprising:
   at least one memory storing instructions; and
   at least one processor configured to execute the instructions to:
      acquire user information related to usage manners of a user;
      calculate and accumulate a manner score according to the user information;
      compare, when a user associated with a past manner score matches a user associated with a current manner score, a past manner score with a current manner score, and generate a comparison result; and
      present, to a user, information according to the comparison result.

2. The information processing system according to claim 1, wherein
   at least one processor is further configured to execute the instructions to recognize a user from the user information, and
   accumulate a calculated manner score in association with a recognized user.

3. The information processing system according to claim 1, wherein at least one processor is further configured to execute the instructions to acquire the user information by at least one of a camera, a sound sensor, and a vibration sensor.

4. The information processing system according to claim 2, wherein at least one processor is further configured to execute the instructions to acquire the user information by a camera for acquiring an image of a periphery of a user, and recognize a user from an image captured by the camera.

5. The information processing system according to claim 1, at least one processor is further configured to execute the instructions to present, according to the comparison result, at least one of warning information, award information, and advice information for improvement in usage manners.

6. An information processing method causing a computer to execute processing of:
   acquiring user information related to usage manners of a user;
   calculating and accumulating a manner score according to the user information; and
   comparing, when a user associated with a past manner score matches a user associated with a current manner score, a past manner score with a current manner score, and presenting, to a user, information according to a comparison result.

7. A non-transitory computer-readable medium configured to store a program causing a computer to execute processing of:
   acquiring user information related to usage manners of a user,
   calculating and accumulating a manner score according to the user information,
   comparing, when a user associated with a past manner score matches a user associated with a current manner score, a past manner score with a current manner score, and
   presenting, to a user, information according to a comparison result.

* * * * *